Nov. 14, 1944.  A. B. AUSTIN  2,362,526
SECTIONAL FIREPLACE HEATER
Filed Oct. 21, 1940  4 Sheets-Sheet 1
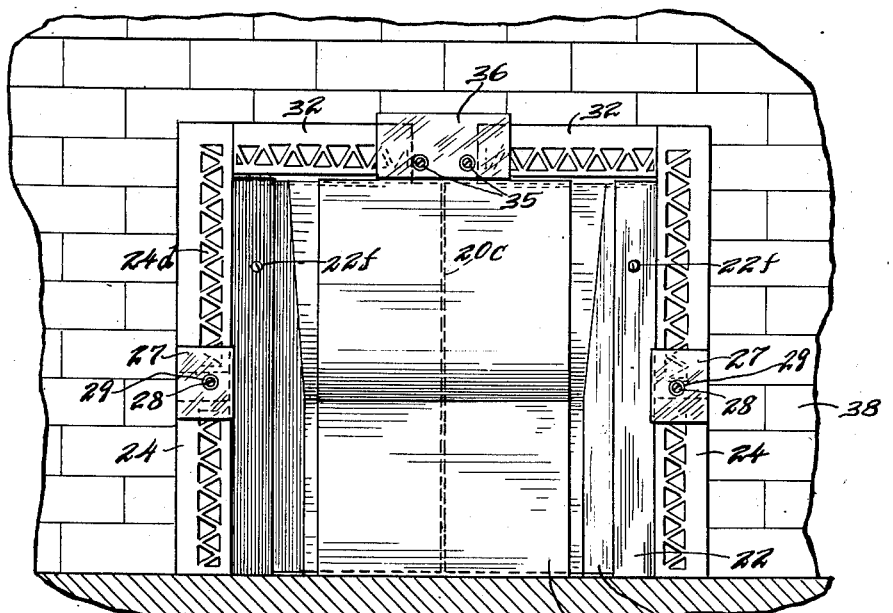
Fig. 1.
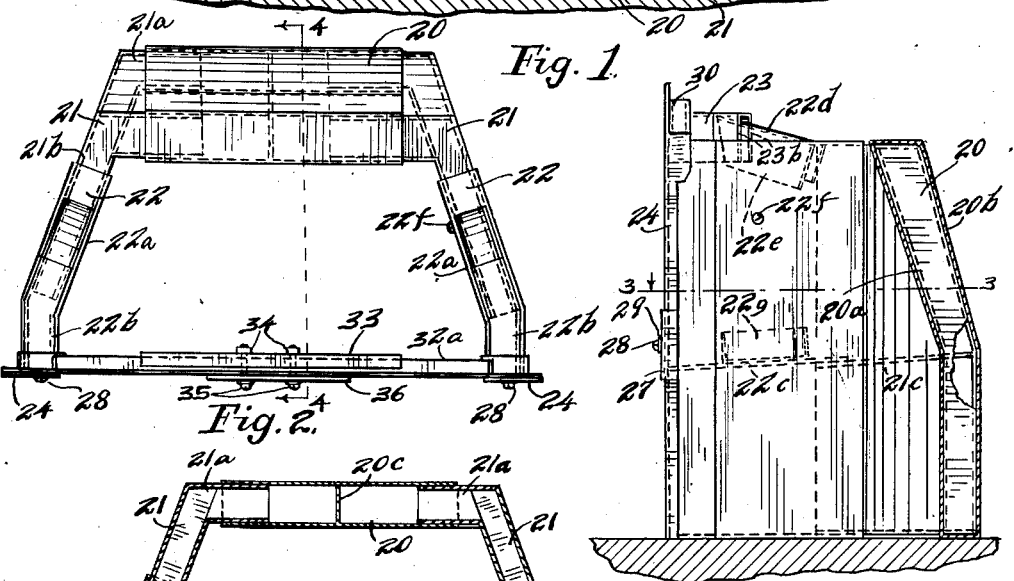
Fig. 2.
Fig. 4.
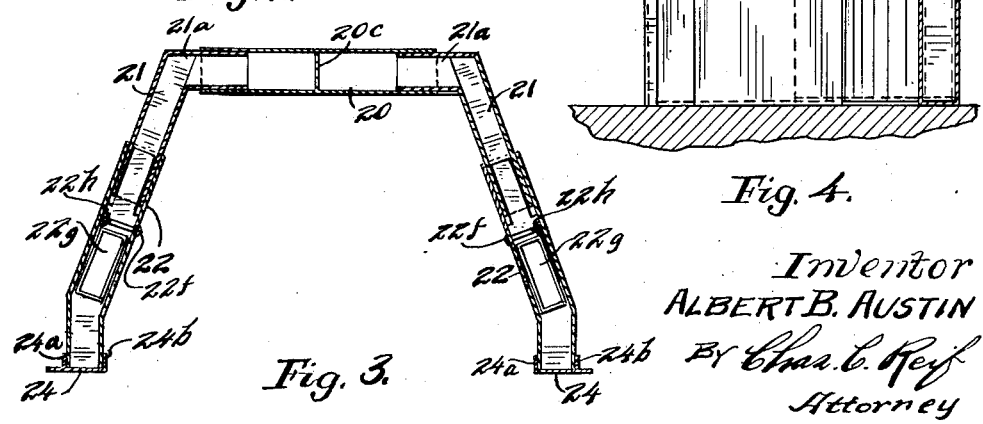
Fig. 3.
Inventor
ALBERT B. AUSTIN
By Chas. C. Reyf
Attorney Nov. 14, 1944.  A. B. AUSTIN  2,362,526
SECTIONAL FIREPLACE HEATER
Filed Oct. 21, 1940  4 Sheets-Sheet 2
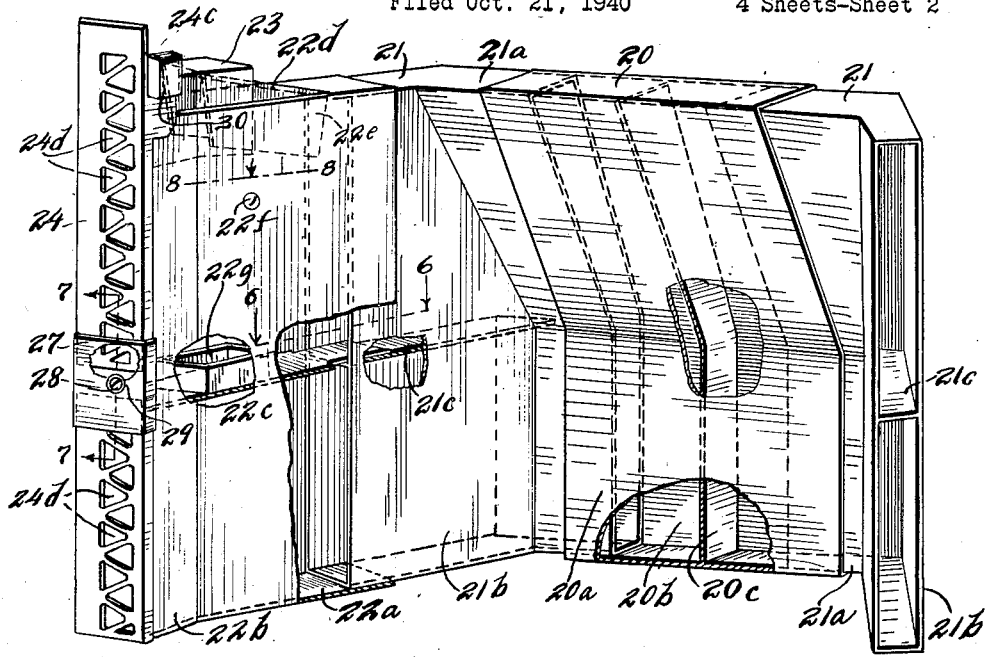
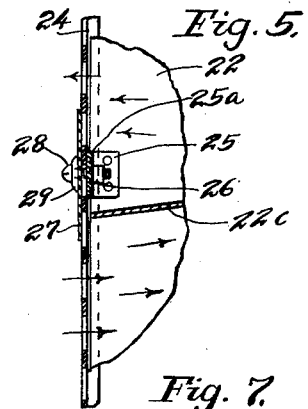
Fig. 5.
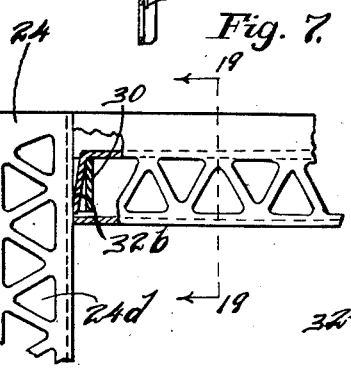
Fig. 7.
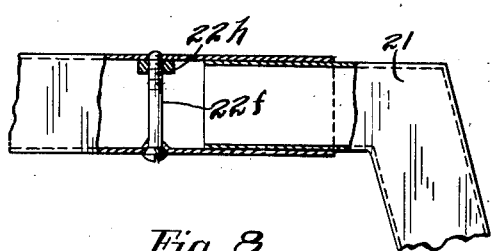
Fig. 6.
Fig. 8.
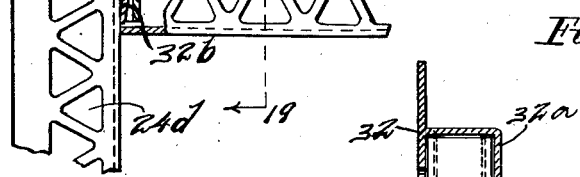
Fig. 9.
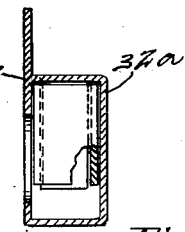
Fig. 19.
Inventor
ALBERT B. AUSTIN
By Chas. C. Reif
Attorney Nov. 14, 1944.  A. B. AUSTIN  2,362,526
SECTIONAL FIREPLACE HEATER
Filed Oct. 21, 1940  4 Sheets-Sheet 3

Inventor
ALBERT B. AUSTIN
By Chas. C. Reif
Attorney

Nov. 14, 1944.   A. B. AUSTIN   2,362,526
SECTIONAL FIREPLACE HEATER
Filed Oct. 21, 1940   4 Sheets-Sheet 4

Inventor
ALBERT B. AUSTIN
BY Chas. E. Reif
Attorney

Patented Nov. 14, 1944

2,362,526

UNITED STATES PATENT OFFICE 2,362,526

SECTIONAL FIREPLACE HEATER

Albert B. Austin, Minneapolis, Minn.

Application October 21, 1940, Serial No. 362,068

11 Claims. (Cl. 126—121)

This invention relates to a supplemental heater for a fireplace and particularly to a supplemental or auxiliary heater for discharging heated air into the room to be heated.

As is well known a fireplace is quite inefficient as a heating means. Most of the air heated by the fire is drawn up the chimney and the heat transmitted to the room is almost altogether that transmitted by direct radiation.

While it has been previously proposed to apply air heaters to fireplaces, no practical device which could be used with fireplaces already constructed has been produced. Very few people will go to the expense of having a fireplace entirely torn out and rebuilt merely for the purpose of installing an auxiliary heater.

It is an object of this invention to provide a simple and efficient device constructed and arranged to be fitted to fireplaces of different sizes.

It is a further object of the invention to provide a simple and efficient auxiliary air heating device for a fireplace comprising a plurality of sections adapted to fit together in extensible relation so that the device can be changed to suit fireplaces having different widths, heights and depths.

It is also an object of the invention to provide an auxiliary air heating device for a fireplace comprising a member or section adapted to fit along the rear wall of the fireplace and having one or more sections telescopically slidable thereon arranged to extend along the side walls to the front of the fireplace, said device having a partition or partitions extending from the front to the rear thereof forming upper and lower passages communicating at the rear of the device whereby air can pass into the lower of said passages, be heated and pass out at the upper of said passages and whereby said device may be changed in size to fit the particular fireplace in which it is to be installed.

It is a further object of the invention to provide an auxiliary air heating device for a fireplace comprising a casing having spaced walls forming a chamber and having slidable sections at the top whereby the device can be made to fit fireplaces of different heights.

It is another object of this invention to provide a fireplace heating unit adapted to be used in new installations of fireplaces and comprising a casing having chambers therein, said casing extending along the rear and side walls of the fireplace and having openings at its front for the entrance and exit of air.

It is still another object of the invention to provide a fireplace heating device comprising a hollow casing extending along the rear and side walls of the fireplace, together with means for forcing a current of air through said casing preferably by having a fan disposed in a casing at the front of the fireplace.

It is still another object of the invention to provide a fireplace heating device comprising a casing having portions extending along the rear and side walls of the fireplace constructed and arranged to also act as a humidifier.

These and other objects and advantages of the invention will be fully set forth in the following description made in connection with the accompanying drawings in which like reference characters refer to similar parts throughout the several views and in which:

Fig. 1 is a view in front elevation of the device in position in a fireplace;

Fig. 2 is a top plan view of the device;

Fig. 3 is a horizontal section taken substantially on line 3—3 of Fig. 4 as indicated by the arrow;

Fig. 4 is a view partly in side elevation and partly in vertical section on line 4—4 of Fig. 2 as indicated by the arrows;

Fig. 5 is a partial perspective view of the device in assembled position, some parts being broken away and others shown in vertical section;

Fig. 6 is a horizontal section taken substantially on line 6—6 of Fig. 5 as indicated by the arrows;

Fig. 7 is a vertical section taken substantially on line 7—7 of Fig. 5 as indicated by the arrows;

Fig. 8 is a horizontal section taken on line 8—8 of Fig. 5 as indicated by the arrow;

Fig. 9 is a partial view in front elevation, some parts being broken away and others shown in vertical section;

Fig. 19 is a vertical section taken on line 19—19 of Fig. 9 as indicated by the arrows.

Figure 10:
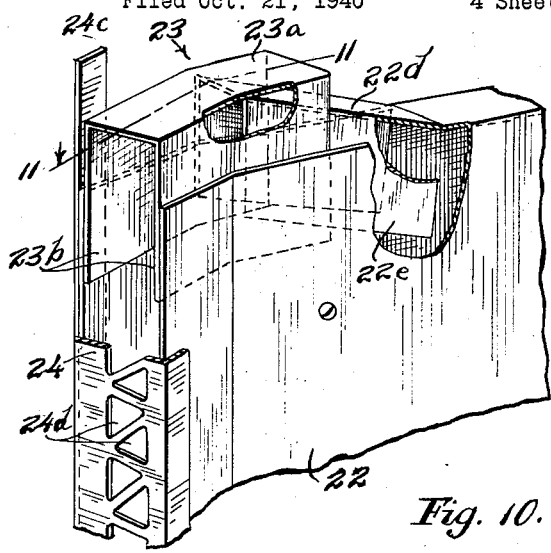
Fig. 10 is a partial perspective view, some parts being broken away and others shown in vertical section.
Figure 11:
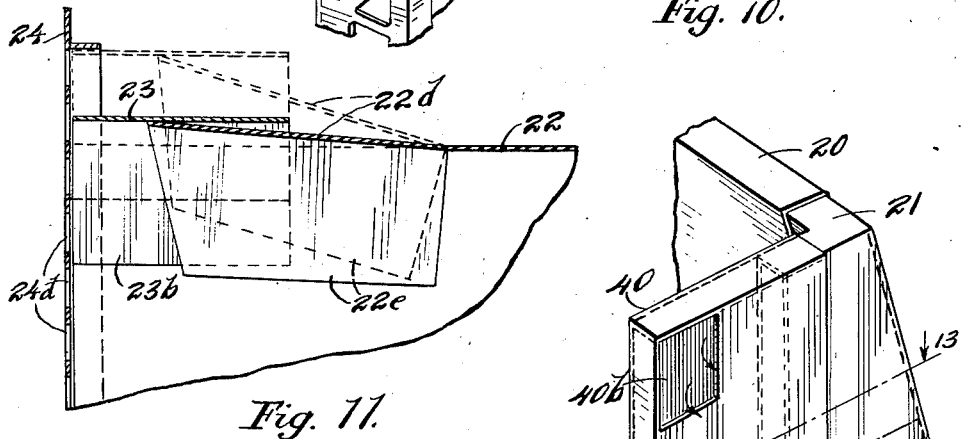
Fig. 11 is a vertical section taken substantially on line 11—11 of Fig. 10 as indicated by the arrows.

Referring to the drawings, a device is shown comprising a central section 20. This section as shown is hollow having spaced front and rear walls 20a and 20b respectively. The said front and rear walls extend vertically in substantially parallel relation at their lower portions but extend forwardly in somewhat diverging relation at their upper portions. Section 20 is closed at its top and bottom but is open at its ends. This section is shaped to fit against the rear wall of a fireplace. A partition 20c extends vertically in section 20 substantially midway between the ends thereof dividing the chamber in said section into two parts. Sections 21 are also provided and these sections have end portions 21a of the same shape in vertical cross section as section 20. The portions 21a, however, are somewhat smaller than the ends of section 20 and are constructed and arranged to fit snugly in and telescope into the ends of the section 20 as shown in Figs. 2, 3 and 5. Sections 21 also have forward portions 21b illustrated as disposed in vertical planes and making an angle somewhat greater than a right angle with portions 21a. The vertical walls of portions 21b are substantially parallel from top to bottom. The sections 21 are also closed at the top and bottom but like sections 20 are open at their ends. A partition 21c extends from front to rear of portions 21b dividing the chamber therein into upper and lower passages. Partition 21c in the embodiment of the invention illustrated does not extend to the end of portion 21a. It will be seen that sections 21 can be moved more or less into section 20 and positioned to give greater or less width to the rear portion of the combined assembly. Front sections 22 are provided, the same having portions 22a of the same shape in vertical cross section as the portions 21b. Portions 22a, however, are made somewhat larger so that portions 21b may fit snugly and slidably therein, thus bringing said parts into telescoping relation. Sections 22 have forward portions 22b of the same shape and size as portions 22a but extending at an obtuse angle thereto so that portions 22b extend substantially at right angles to the section 20. Sections 22 are provided with partitions 22c extending from the front thereof to the rear thereof through both portions 22a and 22b. Partition 22c is reduced in width at its inner end and projects from portion 22a, the same being of a width so as to slide snugly between the walls of portion 21b above partition 21c and in contact with the latter. As shown in Fig. 5 partitions 22c and 21c extend upwardly at a small angle to the horizontal. It is obvious that sections 22 can be positioned at different points on sections 21 so as to increase or decrease the forwardly extending part or side parts of the assembly. As shown more particularly in Figs. 4, 10 and 11 the sections 22 are closed at the bottom but have a fixed top wall only at the rear portion which fits over the section 21. A swinging portion 22d is provided connected to the top portion for vertical swinging movement and having downwardly extending side portions 22e which fit snugly between the side walls of a movable section 23. Section 23 has a top wall 23a and downwardly extending parallel side walls 23b which fit snugly between the side walls of section 22. The section 23 is of angular formation to fit the similar formation of section 22. Each section 23 can be raised or lowered to different positions and the swinging portion 22d is positioned with its forward top edge against the top wall 23a. Some distance below its top each section 22 has secured to its inner side a nut 22h adapted to receive a bolt 22f extending between the sides of said section and having a head countersunk into the side opposite that to which nut 22h is secured. Bolt 22f can be tightened and will clamp section 23 in its adjusted position.

Front panel members or grids 24 are provided at each side of the device. Said members 24 have flanges 24a and 24b which fit snugly over the outer side of the walls of sections 22 at their front portions. In order to have the panels 24 applied to fireplaces of different heights and to accommodate different vertical adjustments of sections 23, the same are made in two parts. A small strip of metal 25 is secured to the inner sides of section 22 and has a front portion 25a extending between said sides at the front thereof. A nut 26 is provided and preferably welded to the inner side of portion 25a. A plate 27 is provided, the same fitting over the adjacent portions of the panel 24 and extending along the inner edge or flange thereof. A screw 28 passes through plates 25 and 27 and into nut 26 for holding plate 27 in place. A small convex washer 29 underlies the head of screw 28. It will be seen that the upper and lower parts of panel 24 can be rather widely separated or can be close together and still be covered by plate 27. Adjacent its top panel 24 has its flange 24b made of greater width and a U-shaped clip or plate 30 is secured thereto. Panel 24 is provided with openings 24d which are alined with the open front of the sections 22 and while these may be of any desired shape, in the embodiment of the invention illustrated they are shown as substantially triangular.

A top panel or grid 32 is provided similar in front appearance to panel 24. Said panel 32 has a box-like portion 32a at its rear side and like panels 24 is made in two parts. A U-shaped or trough-shaped plate 33 embraces the portions 32a and has secured thereto as by welding the nuts 34. A plate 36 is provided which extends between and over the end portions of the two parts of panel 32. Screws 35 extend through plate 36 and members 32 and 33 and into the nuts 34 for holding or clamping plate 36 in place. It will be seen that the adjacent ends of the two parts of panel 32 can be disposed at different distances apart and still be covered by plate 36. This structure acommodates the adjustment in width of the device made by adjusting sections 20 and 21. The end portions of panel 32 are provided with downwardly extending tongues 32b which are received within the clips 30 as shown in Fig. 9. The panel 32 is thus supported on panels 24. As shown in Fig. 1 the tops of panels 32 and 24 are flush with each other and the panels 24 and 32 extend over the adjacent brickwork 38 of the fireplace structure. Panel 32 is provided with openings to match those in panels 24 and this is merely for ornament.

The partitions 22c have small rectangular cups or vessels 22g formed thereon adapted to receive water. This will be evaporated and carried into the room with the heated air. The device is thus also a humidifier.

The device is designed to be fitted into fireplaces of different sizes. In installing the device the section 20 as stated will be placed against the rear wall of the fireplace at the central portion thereof or it may replace the firebrick already in the fireplace. The sections 21 will be telescoped into section 20 and will then be adjusted so that their outer sides fit against the end walls of the fireplace. Sections 22 are then placed over the front portions of sections 21 and these will be adjusted so as to come flush with the front of the brickwork 38 or the front of the fireplace wall. The sections 23 can be adjusted to get the desired height for the fireplace. The panels 24 and 32 can then be placed in position and secured by the respective screws described. With a fire in the fireplace the flame and hot gases from combustion will heat the walls of the various sections, particularly of section 20. Air will be drawn into the device through the openings in panel 24 and below partition 22c. This air will pass rearwardly in the passage beneath partition 22c and partition 21c to the rear portion of section 21. Here the air will pass around the end of partition 21c and upwardly into the passage above partitions 21c and 22c and will pass out through the openings in the upper part of panel 24. There is a strong current of air through the device and a large amount of heated air is delivered from the upper part of sections 22 into the room. A great deal of heat is therefore delivered to the room which would otherwise not be utilized. The air will also be humidified by the water in vessels 22g. It will be noted that there is a closed passage in the upper part of sections 22 beneath the top wall 23a of section 23 and beneath the top 22d and between walls 22e.

Figure 12:
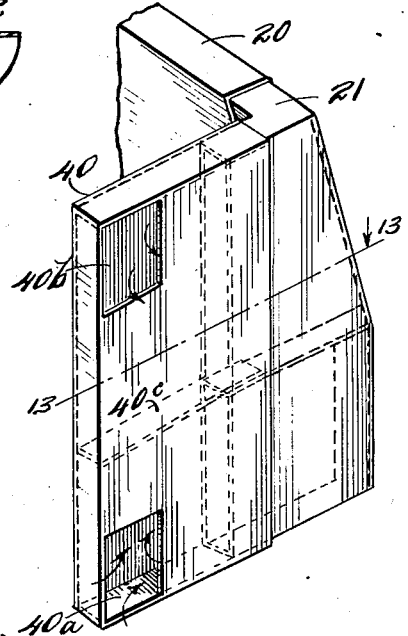
Fig. 12 is a perspective view of one side of the device showing a modification.
Figure 13:
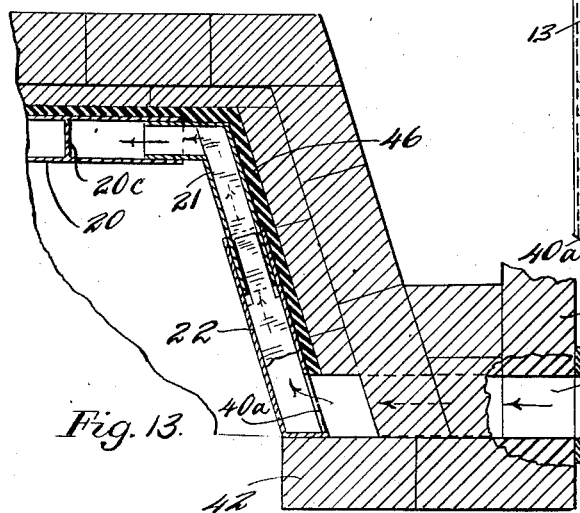
Fig. 13 is a horizontal section taken substantially on line 13—13 of Fig. 12 as indicated by the arrow showing the structure installed in a fireplace.

The structure above described as stated is for installation in fireplaces already built. Where persons desire to have more fire space and are willing to remove the side fire brick, the form shown in Figs. 12 and 13 may be used. Sections 20 and 21 are as already described but a section 40 would be used in place of sections 22 and 23. Section 40 is of rectangular form in vertical and horizontal cross section and has closed top and bottom as well as front. An opening 40a is provided in one side wall adjacent the front and bottom of the device at the outer side thereof and a similar opening 40b is provided adjacent the front and top at the outer side thereof. When the device is installed as shown in Fig. 13 the openings 40a and 40b will communicate with some opening or passage at or adjacent the front of the fireplace. With the installation the front of section 40 is in the rear of and concealed by the facing 42 of the fireplace structure. Fireplaces are very frequently constructed with a side wall or surface 43 as shown in Fig. 13. If desired a passage 44 may pass from the side wall 43 through the fireplace structure and communicate with opening 40a. A similar passage will be provided at the upper part of the fireplace to communicate with opening 40b and this passage may have its outlet at any desired height adjacent the fireplace. A grid 45 is shown disposed over the outlet of passage 44 and a similar grid would be used over the outlet of the passage at the upper part of the fireplace which communicates with opening 40b. In Fig. 13 a layer of insulating material 46 is shown disposed between the heating device and the facing or fire brick of the fireplace.

Figure 14:
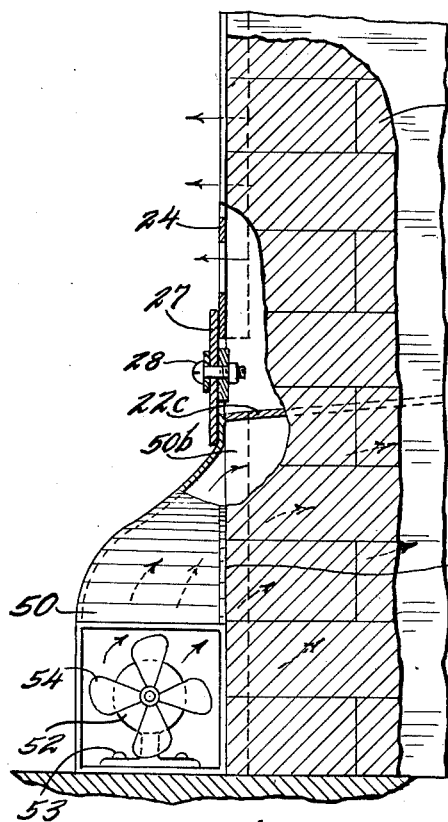
Fig. 14 is a view partly in vertical section through the fireplace wall and partly in side elevation showing a modification.
Figure 15:
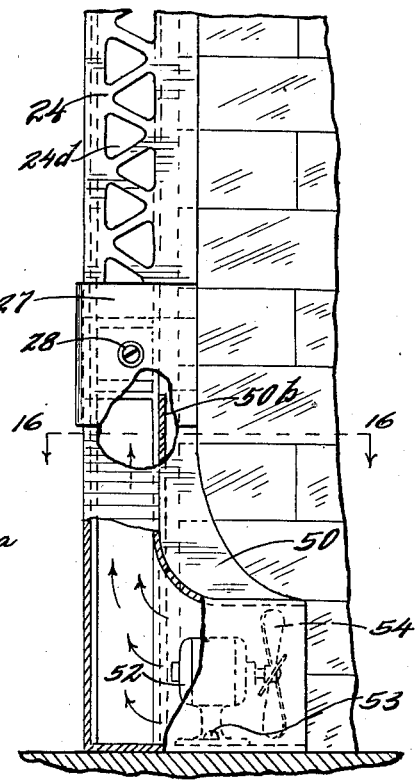
Fig. 15 is a view in front elevation of the parts shown in Fig. 14, some portions being broken away and others shown in vertical section.
Figure 16:
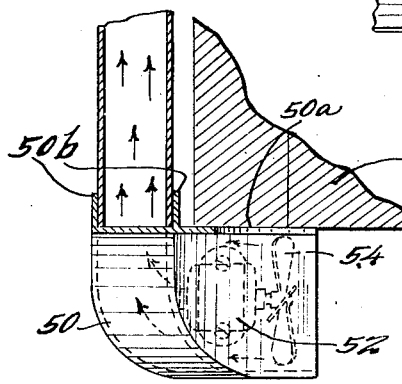
Fig. 16 is a horizontal section on line 16—16 of Fig. 15 as indicated by the arrows.

Referring to Figs. 14 to 16, a device is shown such as illustrated in Figs. 1 to 11 but in which the lower plates 24 are not used. Instead of the lower plates 24 a casing 50 is provided, the same having a flat surface 50a at one side adapted to fit against the front of the fireplace wall and to be flush with the end of the side section 22. Said casing is provided with vertical flanges 50b adapted to be disposed at the sides of the front portion of section 22 below the partition 22c. The upper part of casing 50 as shown in Fig. 14 is substantially flush with the top of partition 22c and is overlapped by the lower portion of plate 27. Casing 50 rests on the floor and has a portion at the front of the fireplace wall 51. The end of casing 50 which faces toward the center of the fireplace or laterally is open and a small motor 52 is mounted in the bottom of casing 50 being secured by the screws 53, which motor has secured to its armature shaft a fan 54.

In operation motor 52, which will be provided with a cord and plug, will be connected to some convenient socket or source of electric current. Fan 54 will be operated and will be arranged to draw air into the open end of casing 50 and direct the same into the passage in portion 22b below partition 22c. This air will pass through the side portion or portions into the rear portion and around the end of partition 21c and will then pass outwardly through the upper passage above partition 22c and into the room through the openings 24d in plate 24. With this forced circulation the air will be positively delivered outwardly into the room and a great and increased heating effect will be produced. The casing 50 is quite small and will take up little room at one or both sides of the fireplace.

Figures 17, 18:
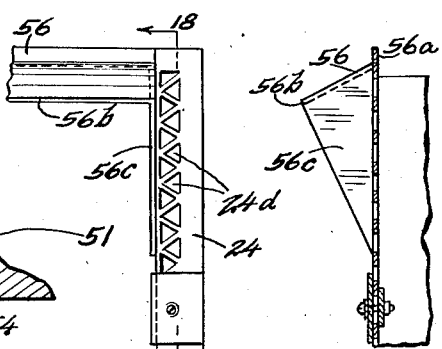
Fig. 17 is a partial view in end elevation showing a modification.
Fig. 18 is a vertical section taken on line 18—18 of Fig. 17 as indicated by the arrows.

In Figs. 17 and 18 a modified form of the invention is shown. The front plates 24 are used and are the same as already described. A cross top plate 56 is provided which replaces the plate 32 shown in Figs. 1 and 2. Plate 56 has a top or upper vertical portion 56a and a forwardly and downwardly projecting portion 56b. At each end of plate 56 a flange 56c extends downwardly, the same being substantially triangular in form and tapering downwardly toward the front of plate 24 as shown in Fig. 18. Plate 56 will be supported upon the plates 24 just as is the plate 32. Plate 56 will be in two parts and the adjusting means including the center plate corresponding to plate 36 will also be used.

The portion 56b supports the plate or flanges 56c. The plates 56c prevent hot air issuing from the heating device through the openings 24a from being drawn into the upper portion of the fireplace at the inner sides of plates 24. At the upper portion of the fireplace there is a strong tendency for the air to be drawn up the chimney through the fireplace. By having the plates 56c the heated air issuing from openings 24a passes out into the room.

From the above description it will be seen that I have provided a very efficient and adaptable structure for an air heating device to be used with a fireplace. The various sections described will preferably be made from sheet metal, such as steel, which will be of a gauge to suit operating conditions. With the described structure the device can readily be fitted into a fireplace already in use. The various adjustments enable the device to be brought to a size to fit the fireplace both in breadth, depth and height. The panels 24 and 32 are ornamental and the design of these as stated can be varied as desired. The device can be produced at a very reasonable cost and the same will add greatly to the heating effect of a fireplace. The device will require little if any attention for maintenance and it will be made to be very durable. It will be obvious that for new installations two or more of the casing portions may be made integral. The device has been amply demonstrated in actual practice and found to be very successful and efficient.

It will, of course, be understood that various changes may be made in the form, details, arrangement and proportions of the parts, without departing from the scope of applicant's invention, which generally stated, consists in a device capable of carrying out the objects above set forth, in the parts and combinations of parts disclosed and defined in the appended claims.

What is claimed is:

1. An air heating device for a fireplace comprising a hollow section constructed and arranged to fit against the rear wall of said fireplace, a second portion at one side of said section telescopically fitting said section and movable transversely of said rear wall to fit various widths of fireplaces, said combined parts extending along the rear and sides of said fireplace to the front thereof, a partition dividing the chambers in said parts which extend along said sides into upper and lower passages communicating in said first mentioned section, said passages having openings adjacent the front of said fireplace whereby air will pass into the lower of said openings around said partition and out at the upper of said openings.

2. An air heating device for a fireplace comprising a hollow section having a chamber therein constructed and arranged to fit against the rear wall of said fireplace, hollow portions at each side thereof having chambers therein constructed and arranged to fit telescopically with said first mentioned section, said combined parts thus being extensible or contractible so as to extend along the rear and side walls of said fireplace to the front thereof, said portions having partitions therein extending from the front thereof and dividing the chambers therein into upper and lower passages communicating in said first mentioned section, said passages in said last mentioned sections having openings adjacent the front of said fireplace whereby air will pass into the lower of said openings around said partitions and out at the upper of said openings when said sections are heated by the fire of said fireplace.

3. The structure set forth in claim 2 and a vertical partition adjacent the center of said first mentioned section extending across the chamber therein whereby said passages are separated at each side of said device.

4. An air heating device for a fireplace comprising a hollow section having a chamber therein, said section having portions adapted to extend respectively along the rear wall and side walls of a fireplace to the front thereof, partitions respectively disposed in and extending rearwardly from the front of said portions that are adapted to extend along the side walls of said fireplace, said partitions dividing said last mentioned portions into upper and lower passages which communicate at the rear of said device, which passages having openings at the front of said device, sections telescopically fitting the tops of said last mentioned portions respectively and vertically movable relative thereto and having chambers communicating with the upper of said passages respectively whereby said last mentioned sections may be moved to different vertical positions to fit different heights of side walls of fireplaces and whereby air may pass into the lower of said openings through said passages and out at the upper of said openings.

5. The structure set forth in claim 4, said portions having adjacent their front ends movable top portions respectively in the rear of said last mentioned sections adapted to be moved with and engage said last mentioned sections to maintain the top of said device closed.

6. The structure set forth in claim 4 and a clamping means at each side of said first mentioned section for respectively holding said last mentioned sections in fixed position.

7. An air heating device for a fireplace comprising a casing having spaced walls, said casing being constructed and arranged to fit against the rear and side walls of said fireplace and comprising extensible telescoping sections which may be relatively moved to increase or decrease the depth of said casing at each side thereof to fit different depths of fireplaces, said casing extending to the front of said fireplace at each side and having open front portions, said casing having partitions extending respectively from the front thereof rearwardly and dividing the same into upper and lower passages, which passages communicate adjacent the rear of said casing, and apertured plates at the front of said casing at both sides thereof alined with the open front portions thereof and having flanges at their outer sides for overlapping the front of said fireplace, said casing having open upper ends adjacent its front and sections at each side telescopically fitting said open upper ends and adapted to be moved to different vertical positions to suit different heights of fireplaces, said apertured plates being divided so that they can be extended to correspond to the positions of said vertically movable sections.

8. An air heating device for a fireplace comprising a casing having spaced walls, said casing being constructed and arranged to fit against the rear and side walls of said fireplace and comprising extensible telescoping sections which may be relatively moved to increase or decrease the depth of said casing at each side thereof to fit different depths of fireplaces, said casing extending to the front of said fireplace at each side and having open front portions, said casing having partitions extending respectively from the front thereof rearwardly and dividing the same into upper and lower passages, which passages communicate adjacent the rear of said casing, and apertured plates at the front of said casing at both sides thereof aligned with the open front portions thereof and having flanges at their outer sides for overlapping the front of said fireplace and a top plate extending across the top of said fireplace between the side portions of said casing and having a flange overlapping the front of said fireplace at its upper side, said top plate being supported upon said apertured plates at the sides of said casing.

9. An air heating device for a fireplace comprising a casing having a rear portion with spaced walls adapted to substantially fit against the rear wall of a fireplace and having forwardly extending portions at each side with spaced walls adapted to extend along the side walls of said fireplace, said casing comprising a plurality of telescoping sections constructed and arranged to be moved to different positions to fit fireplaces of different widths and depths, said side portions having openings therein at the front of said fireplace, partitions extending respectively from the front of said side portions rearwardly between the top and bottom thereof forming upper and lower passages communicating at the rear of said casing, side plates disposed respectively in front of said side portions at the front of said fireplace and having openings therein alining with the openings in said side portions and a top member extending across the front of said fireplace between the upper ends of said side plates, said casing having vertically movable sections at the upper end of each side portion at its front adapted to be held in different positions to suit fireplaces of different heights, said side plates being divided intermediate their ends and a plate overlying said side plates and extending between the divided portions thereof and overlapping the same so that said portions may be extended to correspond to the height of said side portions.

10. An air heating device for a fireplace comprising a casing having spaced walls, said casing being constructed and arranged to fit against the rear and side walls of said fireplace and comprising extensible telescoping sections which may be relatively moved to increase or decrease the width of said casing to fit different widths of rear walls, said casing having a rear transversely extending portion and side portions extending forwardly and rearwardly, said casing having partitions extending respectively from the front sides thereof rearwardly and dividing said side portions into upper and lower passages having openings located respectively adjacent the front of said fireplace, said passages communicating with said rear portion whereby air will enter the lower of said openings at each side of said casing and will pass out at the upper of said openings at each side of said casing, said casing having open portions adjacent the top at each of said side portions, sections telescopically fitting said open portions and adapted to be moved to different vertical positions to fit different heights of side walls, an openwork member extending vertically at the front of each side portion of said casing, said last mentioned member comprising extensible sections and means for holding said sections in proper position to suit the height of said device and fireplace.

11. An air heating device for a fireplace comprising a hollow member constructed and arranged to fit against the rear wall of said fireplace and having portions extending forwardly along the side walls of said fireplace, said portions having partitions therein respectively forming upper and lower passages communicating at the rear part of said member, hollow members telescopically fitting the front ends of said portions respectively and movable forwardly and rearwardly relatively thereto and extending forwardly along said side walls respectively to the front of said fireplace, a partition dividing the chambers in each of said last mentioned members into upper and lower passages which align with and form continuations of said first mentioned passages respectively, said last mentioned passages having openings adjacent the front of said fireplace whereby air will pass into the lower of said openings through said lower passages to the rear of said first mentioned member and forwardly through the upper of said passages and out at the upper of said openings and said last mentioned members may be moved forwardly and rearwardly to fit fireplaces of different depths.

ALBERT B. AUSTIN.